United States Patent
Uptegrove et al.

(10) Patent No.: US 12,089,586 B2
(45) Date of Patent: Sep. 17, 2024

(54) WATERFOWL DECOY

(71) Applicant: Bass Pro Intellectual Property, L.L.C., Springfield, MO (US)

(72) Inventors: John T Uptegrove, Walnut Grove, MO (US); Edward A Larson, Marshfield, MO (US)

(73) Assignee: Bass Pro Intellectual Property, L.L.C., Springfield, MO (US)

( * ) Notice: Subject to any disclaimer, the term of this patent is extended or adjusted under 35 U.S.C. 154(b) by 0 days.

(21) Appl. No.: 17/719,747

(22) Filed: Apr. 13, 2022

(65) Prior Publication Data

US 2023/0329226 A1 Oct. 19, 2023

(51) Int. Cl.
*A01M 31/06* (2006.01)

(52) U.S. Cl.
CPC .................................. *A01M 31/06* (2013.01)

(58) Field of Classification Search
CPC ...................................................... A01M 31/06
See application file for complete search history.

(56) References Cited

U.S. PATENT DOCUMENTS

| | | | | |
|---|---|---|---|---|
| 1,444,342 | A * | 2/1923 | Godward | A01M 31/06 43/3 |
| 2,237,194 | A * | 4/1941 | Ohnmacht | A01M 31/06 43/3 |
| 2,457,295 | A * | 12/1948 | Woodhead | A01M 31/06 43/3 |
| 3,029,541 | A * | 4/1962 | Palmer | A01M 31/06 43/3 |
| 6,357,161 | B1 * | 3/2002 | Best | A01M 31/06 43/3 |
| 2006/0242883 | A1 * | 11/2006 | Tilby | A01M 31/06 43/3 |
| 2019/0364880 | A1 * | 12/2019 | Norton | A01M 31/06 |

* cited by examiner

*Primary Examiner* — Monica L Perry
*Assistant Examiner* — Brittany A Lowery
(74) *Attorney, Agent, or Firm* — King & Spalding LLP

(57) ABSTRACT

A waterfowl decoy has an elongate body portion with a forward end and a rearward end, and a head portion adjacent the forward end of the body portion, the head portion and the body portion defining an outer surface that simulates a waterfowl. A spoon extends downwardly and forwardly from the forward end of the body portion, the spoon having a leading edge positioned forwardly of the body. A jerk line is attached to the spoon rearwardly of its leading edge, so that when the decoy is deployed in water, pulling the jerk line causes the forward end of the decoy to dive, creating a splash and simulating realistic motion of waterfowl.

18 Claims, 5 Drawing Sheets

WATERFOWL DECOY

FIELD

This disclosure relates to waterfowl decoys.

BACKGROUND

This section provides background information related to the present disclosure which is not necessarily prior art.

Floating waterfowl decoys are deployed on bodies of water individually and in groups to attract waterfowl. These decoys are typically made of wood or plastic, and various systems can be employed to make these decoys appear more lifelike. Sometimes the decoys are motorized to cause them to move on the water. Sometimes the decoys are connected together to enhance their movement on the water. Sometimes the decoys are actuated remotely by jerk strings. However, efforts continue to improve the realism and effectiveness of decoys.

SUMMARY

This section provides a general summary of the disclosure, and is not a comprehensive disclosure of its full scope or all of its features.

Various embodiments of this disclosure provide a waterfowl decoy with realistic action. According to one preferred embodiment a decoy is provided comprising an elongate body portion having a forward end and a rearward end, left and right sides, and a top and a bottom. A head portion adjacent the forward end of the body portion, the head portion and the body portion defining an outer surface that simulates a waterfowl, the body portion being at least partially buoyant in water; a spoon extending downwardly and forwardly from the forward end of the body portion, the spoon having a leading edge positioned forwardly of the body, neck and head; and a jerk line attached to the spoon rearwardly of its leading edge, so that when the decoy is deployed in water, pulling the jerk line causes the forward end of the decoy to dive, creating a splash.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
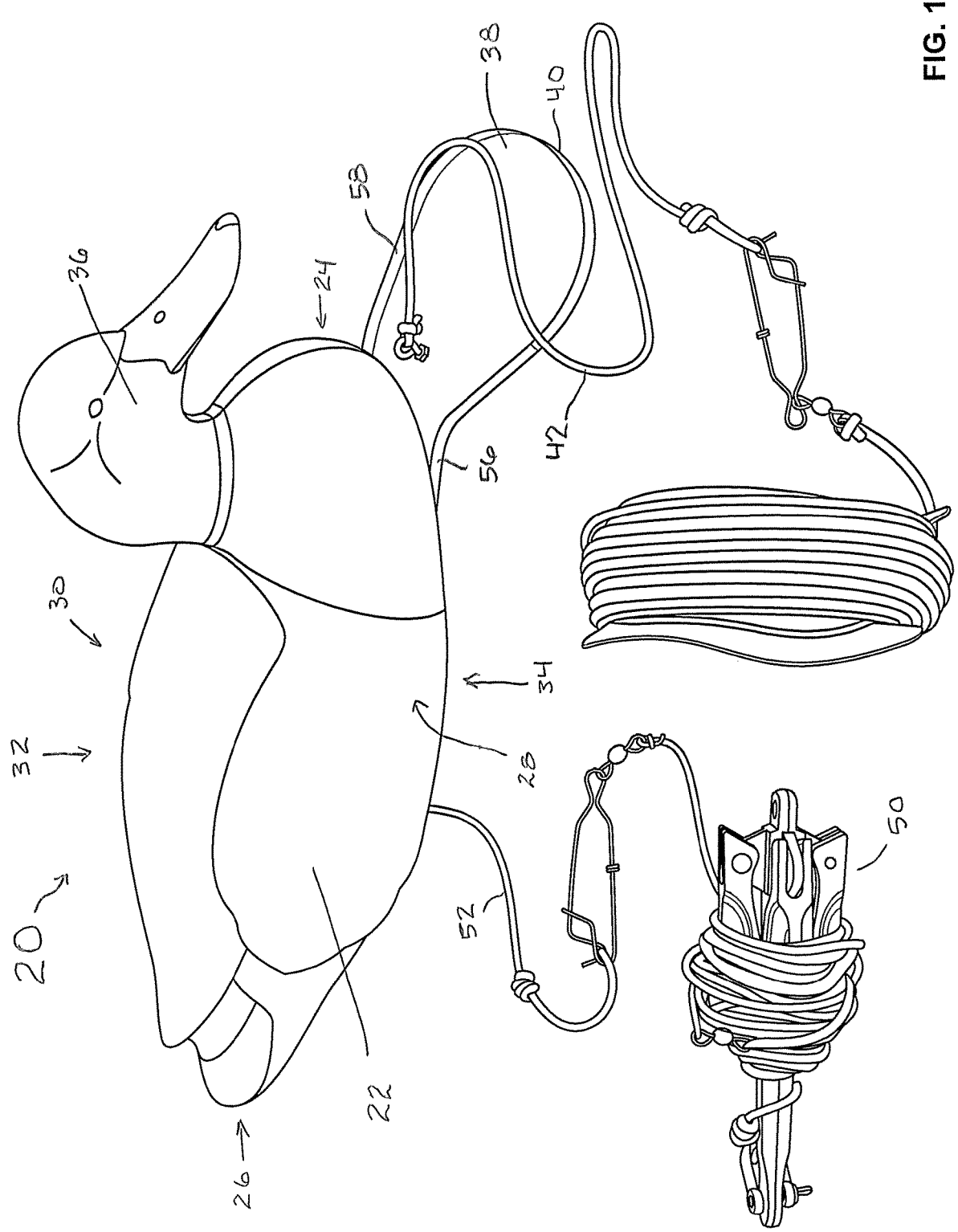
FIG. 1 is a perspective view of a waterfowl decoy according to a first preferred embodiment of this disclosure.

A first preferred embodiment of a waterfowl decoy according to the principles of this disclosure is indicted generally as 20 in FIG. 1. The decoy 20 comprises an elongate body portion 22 having a forward end 24 and a rearward end 26, left and right sides 28 and 30, and a top 32 and a bottom 34. A head portion 36 adjacent the forward end 24 of the body portion 22. The head portion 36 and the body portion 22 defining an outer surface that simulates a waterfowl, such as a duck or a goose. In some embodiments, the forward end 24 of the decoy can have a concave configuration to facilitate and/or enhance the creation of splashes, as described below The decoy 20, and in particular the body portion 22, is at least partially buoyant in water. The decoy 20 can be made of wood or plastic. In particular, the decoy can be made of molded plastic.

The decoy 20 has a protrusion or paddle, such as spoon 38, extending downwardly and forwardly from the forward end 24 of the body portion 22. The spoon 38 slopes downwardly and forwardly from the decoy 20 at an angle of between about 10° and about 75° from horizontal, and more preferably between about 20° and about 45°. The spoon 38 is preferably flat, but it could have some other suitable configuration. For example, curving in the axial direction and/or the transverse direction. The spoon 38 preferably has a curved leading edge 40 positioned forwardly of the body portion 22 and head portion 36, but the leading edge 40 could be straight.

Figure 4:
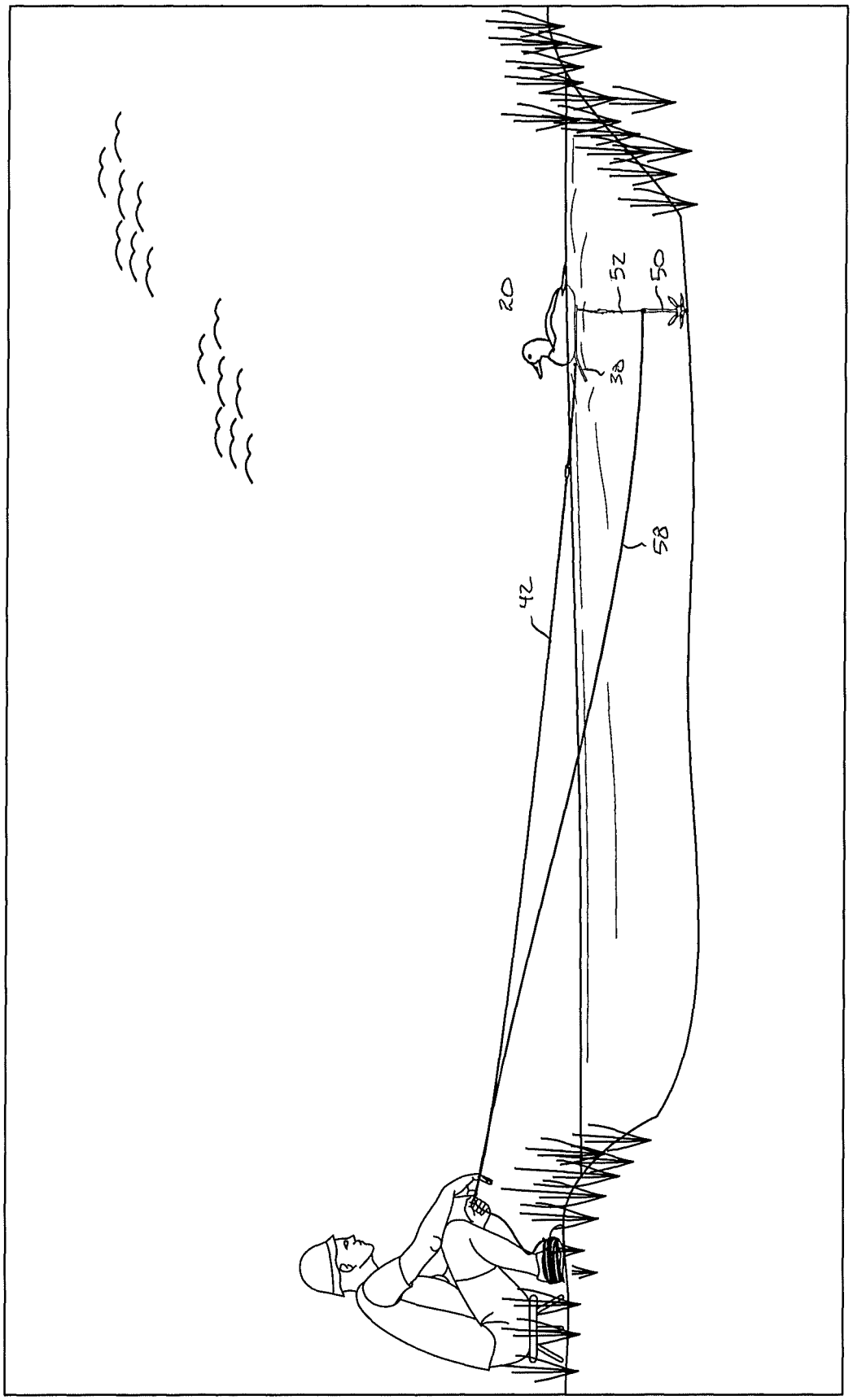
FIG. 4 is a diagram showing a possible deployment of any of embodiments of this disclosure.
Figure 5:
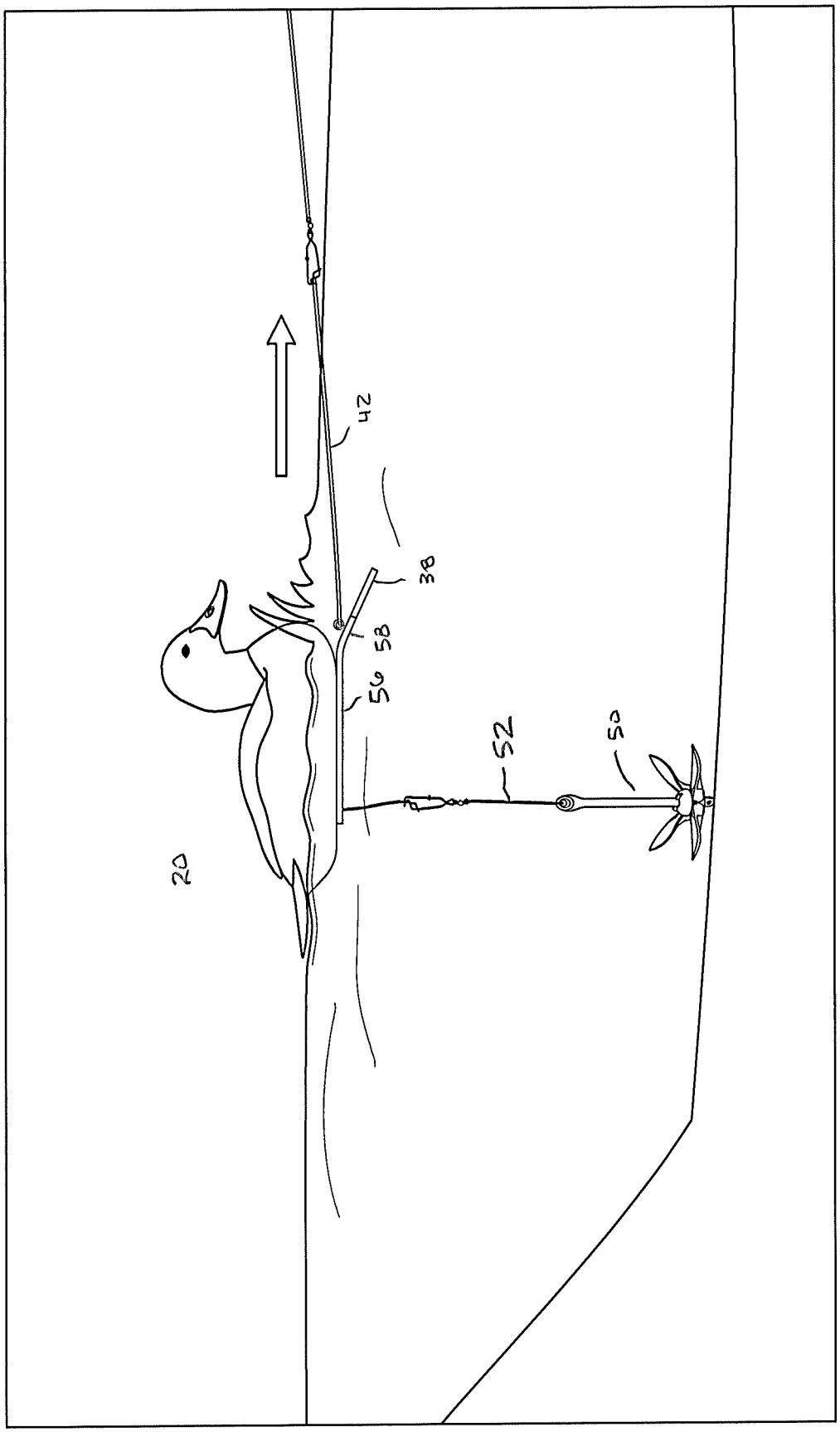
FIG. 5 is a diagram showing operation of any of the embodiments of this disclosure.

A jerk line 42 is attached to the spoon rearwardly of its leading edge, so that when the decoy 20 is deployed in water (as shown in FIGS. 4 and 5, pulling the jerk line 42 causes the forward end 24 of the decoy body portion 22 and head portion 36 to abruptly dive, mimicking natural waterfowl behavior and creating a visible splash. In embodiments where the forward end 24 of the decoy has a concave configuration, this concave shape can contribute to the formation of the "splash" and the forward end submerges. Both of these actions are attractive to waterfowl. Further, the splash creates a bobbing motion of any surrounding decoys, enhancing the attractiveness of an entire decoy array. The jerk line 42 is preferably attached to the spoon forwardly of the forward end 24 of the body portion 22 and head portion 36.

The decoy 20 preferably further comprises an anchor 50, and an anchor line 52 connecting the anchor to the decoy at a point adjacent the rearward end 26 of the body portion 22. The anchor 50 and anchor line 52 help the decoy remain where it is placed in the water, and the further enhance the response of the decoy 20 to the jerk line 42. The anchor line 52 can be elastic so that it causes the decoy to "spring" back when jerked.

Figure 2:
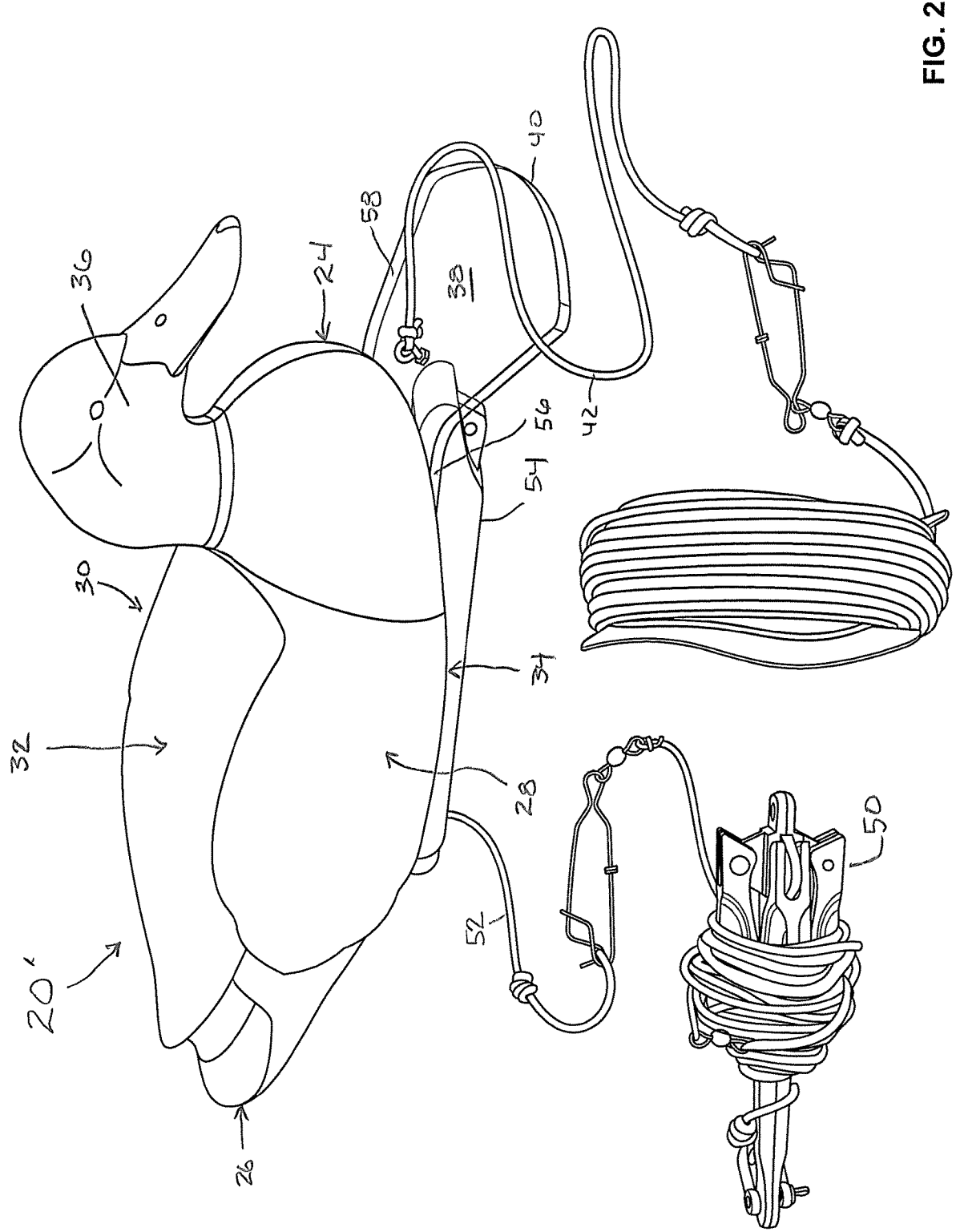
FIG. 2 is a perspective view of a waterfowl decoy according to a second preferred embodiment of this disclosure.
Figure 3:
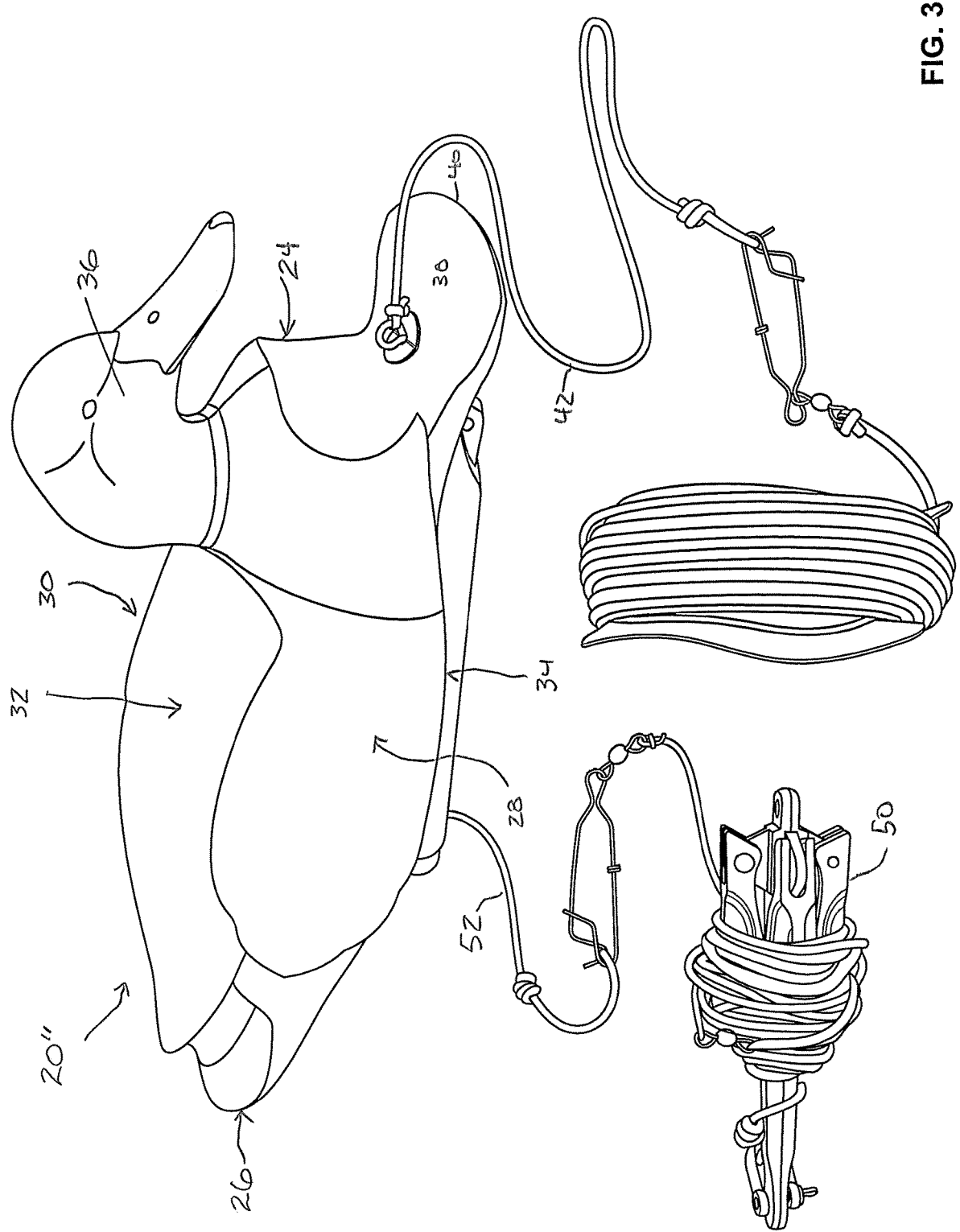
FIG. 3 is a perspective view of a waterfowl decoy according to a third preferred embodiment of this disclosure.

A second preferred embodiment of a waterfowl decoy according to the principles of this disclosure is indicted generally as 20' FIG. 2. Decoy 20' is similar in construction and operation to decoy 20, except that decoy 20' has a weighted keel element 54. The weighted keel element helps to stabilize the decoy 20' and helps keep the decoy properly oriented.

The decoys 20 and 20' each comprise a plate 56, with a downwardly extending forward end 58. The plate 56 is mounted on the bottom 34 of the body portion 22 with the forward end 58 forming the spoon 38. The decoys can be manufactured this way, or the plate 56 can be provided separately and added to a conventional decoy to adapt it to the principals of this invention.

A third preferred embodiment of a waterfowl decoy according to the principles of this disclosure is indicted generally as 20" FIG. 2. Decoy 20" is similar in construction and operating to decoy 20, except that in decoy 20" the spoon 38 is formed integrally with the forward end 24 of the body portion 22, and the forward end 24 has a concave configuration to facilitate the creation of a splash when the line 42 is jerked to cause the decoy 20" to dive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Operation

In operation the decoy 20, 20', and 20" of any of the embodiments of this invention, is deployed in a body of water, as shown in FIG. 4. The anchor 50 attached to the decoy by anchor line 52, holds the decoy generally in place. An optional line 60 can connect to the anchor 50, and held by the user on shore to facilitate retrieval of the decoy and anchor. The jerk line 42 also extends to the user on shore.

As shown in FIG. 5, the user can pull the jerk line 42 to cause the spoon 38 to splash up water, and cause the forward end 24 of the body portion and head portion 36 to dive, simulating realistic motion of waterfowl. The splash and/or simulated motion enhance the attraction of the decoy.

What is claimed is:

1. A waterfowl decoy comprising:
   an elongate body portion having a forward end and a rearward end, left and right sides, and a top and a bottom, and a head portion adjacent the forward end of the body portion, the head portion and the body portion defining an outer surface that simulates a waterfowl, the body portion being at least partially buoyant in water;
   a spoon extending downwardly and forwardly from the forward end of the body portion, the spoon having a leading edge positioned forwardly of the forward end of the body portion and a forward end of the head portion, wherein a width of the spoon across a top surface of the spoon increases with distance from the forward end of the body portion;
   an anchor line and an anchor, wherein a first end of the anchor line is attached to the rearward end of the body portion and wherein a second end of the anchor line is attached to an anchor; and
   a jerk line attached to the spoon rearwardly of the leading edge of the spoon and forwardly of the forward end of the body portion, wherein when the decoy is deployed in water with the anchor and the anchor line in the water, pulling the jerk line causes the forward end of the decoy to dive, creating a splash.

2. The waterfowl decoy according to claim 1, wherein the waterfowl that the head and body portion resembles is a duck.

3. The waterfowl decoy according to claim 1, wherein the leading edge of the spoon is round and a top surface of the spoon is flat.

4. The waterfowl decoy according to claim 1, wherein the spoon slopes downwardly and forwardly from the decoy at an angle of between about 10° and about 80° from horizontal.

5. The waterfowl decoy according to claim 4, wherein the spoon slopes downwardly and forwardly from the decoy at an angle of between about 20° and about 45° from horizontal.

6. The waterfowl decoy according to claim 1, wherein the spoon is formed integral with the body portion.

7. The waterfowl decoy according claim 1, further comprising a plate secured to the bottom of the body portion, and wherein the spoon projects from a forward end of the plate.

8. A waterfowl decoy comprising:
   an elongate body portion having a forward end and a rearward end, left and right sides, and a top and a bottom, and a head portion adjacent the forward end of the body portion, the head portion and the body portion defining an outer surface that simulates a waterfowl, the body portion being at least partially buoyant in water;
   a spoon extending downwardly and forwardly from the forward end of the body portion at an angle of between about 20° and about 45° from horizontal, the spoon having a leading edge positioned forwardly of the forward end of the body portion and a forward end of the head portion, wherein a width of the spoon across a top surface of the spoon increases with distance from the forward end of the body portion;
   an anchor line and an anchor, wherein a first end of the anchor line is attached to the rearward end of the body portion and wherein a second end of the anchor line is attached to an anchor; and
   a jerk line attached to the spoon rearwardly of the leading edge of the spoon and forwardly of the forward end of the body portion, wherein when the decoy is deployed in water with the anchor and the anchor line in the water, pulling the jerk line causes the forward end of the decoy to dive, creating a splash.

9. The waterfowl decoy according to claim 8, wherein the waterfowl that the head and body portion resembles is a duck.

10. The waterfowl decoy according to claim 8, wherein the leading edge of the spoon is round and a top surface of the spoon is flat.

11. The waterfowl decoy according to claim 8, wherein the spoon is formed integral with the body portion.

12. The waterfowl decoy according to claim 8, further comprising a plate secured to the bottom of the body portion, and wherein the spoon projects from a forward end of the plate.

13. A method of improving the functionality of a waterfowl decoy of the type comprising an elongate body portion having a forward end and a rearward end, left and right sides, and a top and a bottom, and a head portion adjacent the forward end of the body portion, the head portion and the body portion defining an outer surface that simulates a waterfowl, the body portion being at least partially buoyant in water, the method comprising:
   securing a plate to the bottom of the body portion of the decoy, a forward portion of the plate comprising a spoon extending forward and downwardly from the body portion, the spoon having a leading edge positioned forwardly of the forward end of the body portion and a forward end of the head portion, wherein a width of the spoon across a top surface of the spoon increases with distance from the forward end of the body portion;

attaching an anchor line and an anchor, wherein a first end of the anchor line is attached to the rearward end of the body portion and wherein a second end of the anchor line is attached to an anchor; and attaching a jerk line to the spoon at a point rearwardly of the leading edge of the spoon and forwardly of the forward end of the body portion, wherein when the decoy is deployed in water with the anchor and the anchor line in the water, pulling the jerk line causes the forward end of the decoy to dive, creating a splash.

14. The method according to claim 13, wherein the spoon slopes downwardly and forwardly from the decoy at an angle of between about 10° and about 80° from horizontal.

15. The method according to claim 14, wherein the spoon slopes downwardly and forwardly from the decoy at an angle of between about 20° and about 45° from horizontal and wherein a top surface of the spoon is flat.

16. The waterfowl decoy of claim 1, wherein a first end of the jerk line is attached to the top surface of the spoon, and wherein a second end of the jerk line is used to pull the jerk line when the decoy, the anchor line, and the anchor are deployed in the water.

17. The waterfowl decoy of claim 8, wherein a first end of the jerk line is attached to the top surface of the spoon, and wherein a second end of the jerk line is used to pull the jerk line when the decoy, the anchor line, and the anchor are deployed in the water.

18. The method according to claim 13, wherein a first end of the jerk line is attached to the top surface of the spoon, and wherein a second end of the jerk line is used to pull the jerk line when the decoy, the anchor line, and the anchor are deployed in the water.

* * * * *